F. L. MORSE.
ADJUSTABLE BEARING FOR SPROCKET WHEELS.
APPLICATION FILED JUNE 1, 1915.
1,218,686.
Patented Mar. 13, 1917.
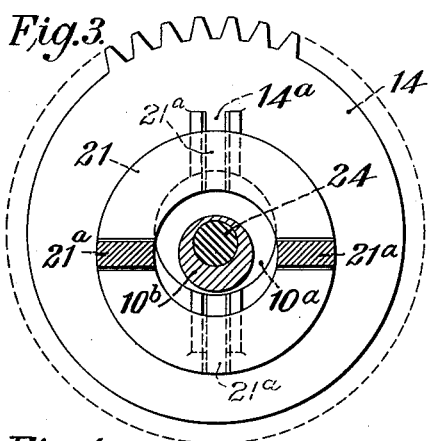
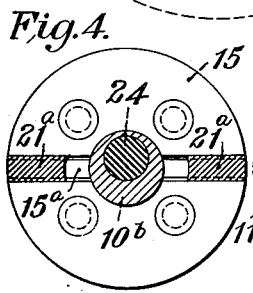
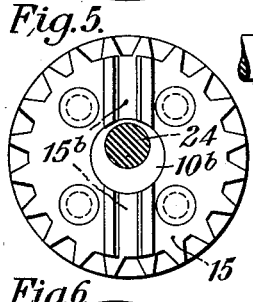
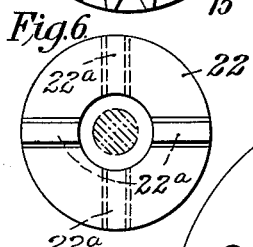
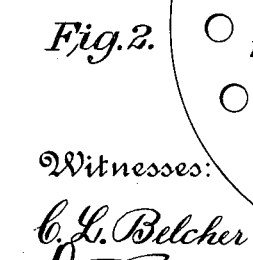
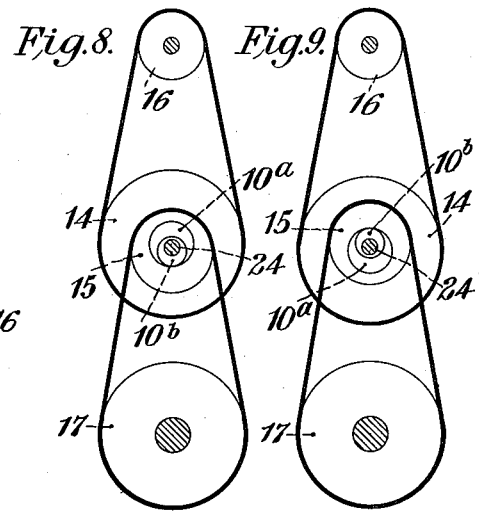
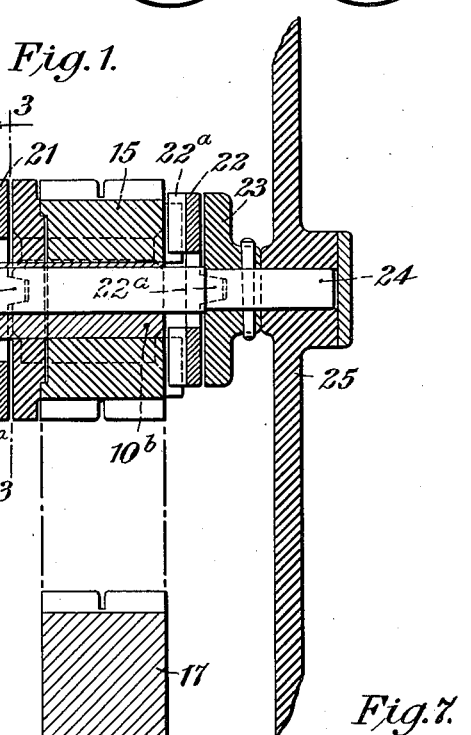
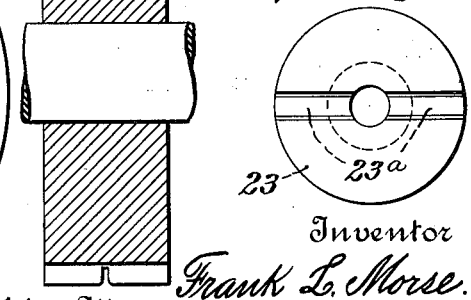
Witnesses:
C. L. Belcher
J. Snowden Bell
Inventor
Frank L. Morse.
By his Attorney
Edward H. Wright.

UNITED STATES PATENT OFFICE.

FRANK L. MORSE, OF ITHACA, NEW YORK, ASSIGNOR TO MORSE CHAIN COMPANY, OF ITHACA, NEW YORK, A CORPORATION OF NEW YORK.

ADJUSTABLE BEARING FOR SPROCKET-WHEELS.

1,218,686.     Specification of Letters Patent.     Patented Mar. 13, 1917.

Application filed June 1, 1915. Serial No. 31,314.

*To all whom it may concern:*

Be it known that I, FRANK L. MORSE, a citizen of the United States, and a resident of Ithaca, in the county of Tompkins and State of New York, have invented a certain new and useful Improvement in Adjustable Bearings for Sprocket-Wheels, of which improvement the following is a specification.

This invention relates to adjustable bearings for sprocket wheels, gear wheels, and the like, in which the wheels are mounted on transversely adjustable bearings, and is particularly adapted for use in the driving mechanism between the engine shaft and the timing shaft and the crank shaft of a gas engine, the object being to provide improved means whereby the slack due to wear in two or more driving connections may be taken up by a single adjustment.

In the accompanying drawings: Figure 1 is a longitudinal sectional view of an adjustable bearing for two driving connections embodying my improvement; Fig. 2, an end view of the adjustable bearing member; Fig. 3, a transverse section taken on the line 3—3 of Fig. 1, and looking in the direction of the arrow; Fig. 4, a similar section taken on the same line, but looking in the opposite direction; Fig. 5, an end view of the bearing member and one of the sprocket wheels, the shaft being indicated in section; Fig. 6, a side view of one of the intermediate coupling disks; Fig. 7, a side view of the shaft coupling member; Fig. 8, a diagrammatic end elevation showing the relative positions of the eccentric bearing portions and the sprocket wheels; and Fig. 9, a similar view showing the relative positions after the extreme adjustment has been made.

As shown in the drawing, the adjustable bearing member, 10, is rotatably mounted in a suitable support, 12, and is provided with two eccentric bearing portions, $10^a$ and $10^b$, on which are mounted the respective sprocket wheels, 14 and 15, connected by suitable drive chains with the corresponding wheels, 16 and 17. In case the two driving connections extend in diametrically opposite directions, as indicated in the drawing, the eccentric bearing portions will also be located at opposite sides of the center of the bearing member which is adapted to be turned from one position to another in its bearing upon the support in making the adjustment, and having means, such as flange, 11, and set screw, 13, for rigidly clamping same in any one of its positions.

For transmitting motion from one sprocket wheel to the other on the bearing member, a flexible coupling device is provided, such as the intermediate coupling disk, 21, having diametrical projections, $21^a$, at right angles to each other on opposite sides of the disk for engaging corresponding grooves, $14^a$ and $15^a$, in the adjacent faces of the wheels. Motion may also be transmitted between one of the wheels, 15, and a shaft, 24, by means of a similar coupling disk, 22, having projections, $22^a$, engaging grooves, $15^b$, on the other face of the wheel, 15, and grooves, $23^a$, in a disk, 23, fixed on the shaft, 24. The projections and grooves of the coupling devices may be slightly tapered in cross section, and held in close engagement with each other by springs, 26, in order to take up wear. The shaft, 24, may extend through the center of bearing member, 10, and have another bearing at its other end in a supporting frame, 25.

Any one of the shafts may serve as the driving shaft and as the two sprocket chain drives are thus operated it will be seen that the power is transmitted from one sprocket wheel to the other on the bearing member through the universal coupling device which allows the positions of said wheels to be shifted relative to each other. As the drive chains become lengthened due to wear, the slack of both driving connections may be taken up by rotatively adjusting the bearing member, 10, whereby the relative positions of the wheels, 14 and 15, are shifted in opposite directions to tighten both chains, owing to the eccentric portions, $10^a$ and $10^b$. The different extreme positions of the drives is indicated diagrammatically in Figs. 8 and 9 of the drawing. It is not necessary that the eccentric bearing portions should be located at 180° from each other as they may be arranged at any suitable or preferred angle, the operation being substantially the same. In this way both driving connections are adjusted by the single element, and the shafts are maintained at the proper angular relation to produce an efficient operation of the mechanism.

Having now described my invention, what I claim as new and desire to secure by Letters Patent is:

1. The combination of a support, an adjustable bearing member mounted in said support, a sprocket wheel rotatably mounted on said member, another sprocket wheel rotatably mounted eccentrically to the first wheel, and a driving connection between said wheels.

2. The combination of a support, an adjustable bearing member rotatably mounted in said support and having a plurality of eccentric portions, means for rigidly fastening said member in its adjusted position, sprocket wheels rotatably mounted on said eccentric portions, and a driving connection between said wheels.

3. The combination of a support, an adjustable bearing member rotatably mounted in said support and having a plurality of eccentric portions, means for rigidly fastening said member in its adjusted position, sprocket wheels rotatably mounted on said eccentric portions, a shaft, and driving connections between the sprocket wheels and between one of said wheels and the shaft.

4. The combination of a support, an adjustable bearing member rotatably mounted in said support, a sprocket wheel rotatably mounted on said member eccentric to the bearing in the support, another sprocket wheel rotatably mounted on said member eccentric to the first wheel and also to the bearing in the support, and a device for driving one wheel by the other.

5. The combination of a support, an adjustable bearing member rotatably mounted in said support and having a plurality of eccentric portions, means for rigidly fastening said member in its adjusted position, sprocket wheels rotatably mounted on said eccentric portions, said wheels having transverse grooves in their adjacent faces, and an intermediate coupling disk having transverse projections on its opposite sides for engaging said grooves.

In testimony whereof I have hereunto set my hand.

FRANK L. MORSE.

Witnesses:
P. C. COLT,
D. B. PERRY.